3,560,624
ANTICOCCIDIAL 2-ALKYLAMINO-4-AMINO
BENZOIC ACIDS
Edward F. Rogers, Middletown, and Robert L. Clark, Woodbridge, N.J., assignors to Merck & Co., Inc., Rahway, N.J.
No Drawing. Continuation of application Ser. No. 408,662, Nov. 3, 1964. This application Oct. 18, 1968, Ser. No. 768,933
Int. Cl. A61k 27/00
U.S. Cl. 424—310        3 Claims

ABSTRACT OF THE DISCLOSURE

Anticoccidial 2-alkylamino-4-amino benzoic acids are prepared by catalytic hydrogenation of 2-loweralkyl-amino-4-nitro benzoic acids. The active compounds may be employed in the form of lower alkyl esters, alkali metal or alkaline earth metal salts, or nontoxic acid addition salts.

---

This is a continuation of application Ser. No. 408,662, filed Nov. 3, 1964, now abandoned.

This invention relates to novel 2-alkylamino benzoic acid compounds, and to the synthesis of such substances. It relates further to novel compositions useful in the treatment and prevention of the parasitic disease coccidiosis containing such new compounds as an active ingredient. It is concerned further with a novel method of controlling coccidiosis, and with animal feeds and feed supplements containing as an active anticoccidial agent certain 2-alkylamino-4-amino benzoic acid compounds.

One object of the present invention is to provide new and novel 2-alkylamino-4-amino benzoic acid compounds, and methods of making such substances. These new compounds may be represented by the formula

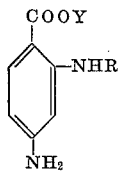

where R represents a lower alkyl group of 1–4 carbon atoms, e.g. methyl, ethyl, isopropyl or butyl, and Y represents hydrogen, lower alkyl, an alkali or alkaline earth metal. Thus Y may be methyl, ethyl, propyl, butyl and the like, or a metal such as sodium, potassium and calcium.

The 2-loweralkylamino-4-amino benzoic acids of this invention are prepared by catalytic hydrogenation of the known 2-loweralkylamino-4-nitro benzoic acids. This is conveniently accomplished by contacting a solution of the starting material with hydrogen in the presence of a noble metal hydrogenation catalyst, and preferably a platinum catalyst such as platinum oxide. The hydrogenation proceeds satisfactorily at room temperature and atmospheric pressure, although elevated temperatures and superatmospheric pressure can be employed if desired. An acidic lower alkanol has been found to be a very suitable solvent medium, examples being ethanol-hydrochloric acid, methanol-hydrochloric acid and the like. The hydrogenation is continued until essentially all of the theoretical amount of hydrogen has been absorbed, at which time the reaction is stopped, and the desired 2-loweralkyl-amino-4-amino benzoic acid recovered by techniques known to those skilled in this art. In this manner 2-methylamino-4-amino benzoic acid, 2-ethylamino-4-amino benzoic acid and 2-propylamino-4-amino benzoic acid are produced from the corresponding 2-loweralkylamino-4-nitro benzoic acid.

These carboxylic acids may be converted to their lower alkyl esters by exposing the free acid to esterification conditions, one example being treatment of the acid with a lower alkanol in the presence of a mineral acid. In addition, the alkali and alkaline earth metal salts are produced by contacting the free acid with base, and particularly with an aqueous alkali or alkaline earth metal hydroxide or carbonate such as potassium hydroxide, sodium hydroxide, sodium carbonate and calcium carbonate.

It will be appreciated by those skilled in this art that the basic amino substitutent in these new 2-loweralkyl-amino-4-amino benzoic acid compounds permits formation of acid addition salts, and such salts are within the purview of this invention. The preferred salts are the non-toxic mineral acid addition salts such as the hydrochloride, hydrobromide and sulfate.

The 2-loweralkylamino-4-amino benzoic acid compounds of Formula I above have a high degree of anticoccidial activity, particularly against the so-called intestinal species of coccidia such as *E. maxima*, *E. acervulina*, *E. brunetti* and *E. mitis*. An additional object of the present invention is to provide novel anticoccidial compositions containing such compounds. A still further object is provision of animal feeds and feed supplements containing such compounds as active anticoccidial agents. Another object is provision of a new method of controlling coccidiosis by administration of these substances to poultry susceptible to coccidiosis.

The compounds of Formula I above are employed for the prevention and treatment of poultry coccidiosis by administering them to poultry susceptible to or infected with coccidia. This is normally accomplished by incorporating the coccidiostat in the feed or the drinking water of the birds. In terms of the total feed or liquid intake of the poultry, only minor amounts of coccidiostat are necessary for satisfactory control of the coccidial infection.

The preferred dose levels of 2-loweralkylamino-4-amino benzoic acid compound required for prevention of coccidiosis in poultry will vary to some degree depending upon the specific compound employed as well as the type and severity of the coccidial infection. With 2-ethylamino-4-amino benzoic acid, for instance, a good control of *E. maxima* infection is obtained by administering to the poultry a finished feed containing from about 0.003% to about 0.03% by weight of drug. For best results, however, it is preferred to administer the compounds at levels of from about 0.005% to about 0.025% by weight of the feedstuff. It will be appreciated by those skilled in this art that the lowest levels consonant with fully adequate control of coccidiosis and the development of immunity will be employed in most instances in order to eliminate as far as possible any risk of side effects that might be induced on prolonged feeding of unnecessarily high levels of drug. The finished feed in which the coccidiostat is employed is a nutritionally adequate one containing sources of carbohydrate, protein, fat, vitamins, minerals and other nutritional factors commonly employed in commercial poultry raising.

The new compounds described herein are also useful employed as coccidiostats when administered by way of the drinking water of infected animals. The preferred dose levels in the drinking water are usually somewhat less than those employed in a solid feed inasmuch as poultry drink about twice as much as they eat. Administration of these anticoccidial substances in the drinking water is of advantage when using the compounds therapeutically. It is convenient to prepare dispersible or water-soluble powders in which the coccidiostat is intimately dispersed in a suitable carrier such as dextrose or sucrose at concentrations of from about 0.3% to about 25% by weight. These solids may then be conveniently added to the drinking water by the poultry raisers.

In addition to poultry feeds containing a minor amount of a compound of Formula I above as an effective anticoccidial agent, there are provided in accordance with an additional aspect of this invention poultry feed supplement compositions wherein the 2-loweralkylamino-4-amino benzoic acid compounds are intimately dispersed in or admixed with a suitable solid non-toxic diluent or carrier. The carrier vehicle employed in these supplement compositions should be one in which the coccidiostat is stable, which is compatible with a finished poultry feed and which can be administered with safety to the animals. These feed supplements, which contain a significantly higher percentage of coccidiostat than does the finished feed, are mixed with or blended into the feedstuff. In order to assume uniform distribution of the coccidiostat in the finished feed, it is customary to employ an intermediate dilution step in which the supplement is blended with a portion of the final feed, and this "intermediate mix" is then added to the remainder of the feed with adequate mixing. The coccidiostat compounds described hereinabove may be formulated into feed supplement compositions containing from about 1.0% to about 30% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 5–25% by weight of active ingredient are quite suitable.

The diluents normally employed for these poultry feed supplements are solid orally ingestible poultry feed additives such as distiller's dried grains, corn meal, citrus meal, fermentation residues, ground oyster shells, attapulgus clay, wheat middlings, wheat shorts, molasses solubles, corn cob meal, corn gluten feed, corn germ meal, edible vegetable substances, soybean meal, dehulled soya flour, soybean mill feed, antibiotic mycelia, crushed limestone, soya grits and the like. It is preferred, although not essential, that the carrier be a nutritive one. Examples of typical feed supplements containing a coccidiostat of the present invention are:

A:                                                  Lbs.
  2-ethylamino-4-amino benzoic acid _____   10.0
  Wheat middlings _____   90.0
B:
  Methyl-2-methylamino-4-amino benzoate ____    5.0
  Corn gluten feed _____   95.0

The 2-loweralkylamino-4-amino benzoic acid compounds described herein are primarily effective against the intestinal species E. maxima and E. brunetti while other coccidiostats such as amprolium, nicarbazin, glycarbylamide, 3,5-dinitrobenzamide and 2-methyl-3,5-dinitrobenzamide are more effective against E. tenella and E. necatrix. Thus, one of the purposes of this invention is to provide highly active broad spectrum anticoccidial compositions which comprise a compound of Formula I above and at least one other anticoccidial agent that is effective primarily against E. tenella and/or E. necatrix. In many cases the efficacy of such a combination is greater than would be expected from the activity of either coccidiostat alone.

The following examples are given for the purpose of illustration and not by way of limitation.

EXAMPLE 1

Anticoccidial activity of the compounds of this invention is determined by administering graded concentrations of drug to straight run White Leghorn chicks previously inoculated with sporulated oocysts of Eimeria maxima. The drug is blended in the standard laboratory chick ration just prior to use, and the chicks fed the medicated ration ad libitum. Groups of uninfected and infected, non-medicated chicks are included in the test as normal and positive controls. On the sixth day after infection the birds are weighed, sacrificed and examined for oocysts. The anticoccidial activity of a compound is expressed in terms of the minimum effective dose (in the feed) necessary to reduce significantly the number of oocysts in the birds, as compared with the controls.

In experiments conducted in this manner 2-ethylamino-4-amino benzoic acid is active when administered in the feed at a dose level of 0.005% by weight.

EXAMPLE 2

21 grams of 2-ethylamino-4-nitrobenzoic acid in a mixture of 30 ml. of ethanol and 2 ml. of concentrated hydrochloric acid is hydrogenated at atmospheric pressure and room temperature in the presence of 0.1 gram of platinum oxide catalyst. After the theoretical amount of hydrogen is absorbed the catalyst is removed by filtration and the filtrate concentrated to dryness in vacuo. The residue thus obtained is dissolved in 10 ml. of water containing a small amount of sodium bisulfite. The resulting solution is treated with decolorizing charcoal, the charcoal removed by filtration and sodium acetate added to the filtrate until the solution is not acid to Congo red paper. The solution is then cooled. 2-ethylamino-4-amino benzoic acid crystallizes and is recovered by filtration. It is recrystallized from 7 ml. of absolute ethanol containing 1 ml. of water to give substantially pure material, M.P. 130–131° C.

When other 2-loweralkylamino-4-nitrobenzoic acid compounds are treated in similar fashion, the corresponding 2-loweralkylamino-4-amino benzoic acid is obtained.

The benzoic acid compounds described above are converted to the corresponding loweralkyl esters by heating a solution of the free acid in a loweralkanol (the particular alkanol corresponding to the desired ester) in the presence of concentrated sulfuric acid, this method of preparing esters being known to those skilled in this art. An illustrative example follows:

2.6 ml. of sulfuric acid is added slowly with stirring to a mixture of 1 gram of 2-ethylamino-4-amino benzoic acid in 3 ml. of methanol. The reaction mixture is refluxed for 12 hours and then the methanol is removed in vacuo at a temperature below 40° C. The resulting residue is made alkaline with 10% sodium carbonate solution and the resulting solid recovered by filtration. This is methyl-2-ethylamino-4-amino benzoate and is purified by crystallization from aqueous methanol. Other lower alkyl esters such as the ethyl, propyl and butyl esters, are obtained in similar fashion using the appropriate alcohol.

Acid addition salts of the 2-loweralkylamino-4-amino benzoic acid compounds are obtained by addition of such compounds to acidic ethanol, such as ethanolic hydrogen chloride and ethanolic hydrogen bromide, and precipitation of the acid salt with a solvent such as acetone or ether.

EXAMPLE 3

When the hydrogenation procedure of Example 2 is repeated using 2-methylamino-4-nitro benzoic acid as starting material there is obtained 2-methylamino-4-amino benzoic acid, M.P. 124–125° C., with decomposition. Using the test procedure of Example 1, the compound is active against coccidiosis at a dose level of .005% by weight.

When the hydrogenation procedure of Example 2 is repeated using 2-propylamino-4-nitro benzoic acid as starting material there is obtained 2-propylamino-4-amino benzoic acid, M.P. 118° C.

We claim:
1. An anticoccidial composition which comprises a poultry feed having dispersed therein an anticoccidial amount of a compound having the formula

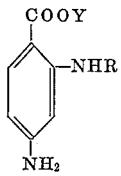

where R is lower alkyl, and Y is selected from the group consisting of hydrogen, lower alkyl, alkali metal and alkaline earth metal.

2. A composition useful for the control of coccidiosis that comprises a solid poultry feed suplement having dispersed therein from about 1–30% by weight of a compound having the formula

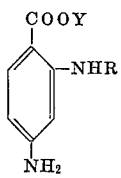

where R is lower alkyl, and Y is selected from the group consisting of hydrogen, lower alkyl, alkali metal and alkaline earth metal.

3. The method of controlling coccidiosis in poultry that comprises orally administering to poultry susceptible to coccidiosis an anticoccidial amount of a compound having the formula

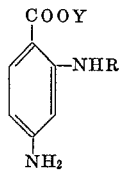

where R is lower alkyl, and Y is selected from the group consisting of hydrogen, lower alkyl, alkali metal and alkaline earth metal.

References Cited

UNITED STATES PATENTS 3,211,610   10/1965   Rogers et al. _____ 424—319

STANLEY J. FRIEDMAN, Primary Examiner

V. D. TURNER, Assistant Examiner

U.S. Cl. X.R.

424—319; 260—471, 518